US007405673B2

(12) United States Patent
Nagafusa

(10) Patent No.: US 7,405,673 B2
(45) Date of Patent: Jul. 29, 2008

(54) OPERATION CONTROL SYSTEM AND IMAGE FORMING APPARATUS

(75) Inventor: Yoshiyuki Nagafusa, Osaka (JP)

(73) Assignee: Kyocera Mita Corporation (JP)

( * ) Notice: Subject to any disclaimer, the term of this patent is extended or adjusted under 35 U.S.C. 154(b) by 211 days.

(21) Appl. No.: 11/371,391

(22) Filed: Mar. 9, 2006

(65) Prior Publication Data

US 2006/0206735 A1  Sep. 14, 2006

(30) Foreign Application Priority Data

Mar. 10, 2005 (JP) .............................. 2005-067977

(51) Int. Cl.
*G06B 21/00* (2006.01)
*G06F 11/00* (2006.01)
(52) U.S. Cl. ...................... 340/635; 340/636.1; 714/14
(58) Field of Classification Search ................ 340/571, 340/572.1–572.9, 635, 636.12, 636.13, 636.15, 340/636.1; 324/133, 539, 711, 771, 433; 323/282, 300; 714/14, 43
See application file for complete search history.

(56) References Cited

U.S. PATENT DOCUMENTS 5,570,002 A * 10/1996 Castleman .................. 323/283
6,005,484 A * 12/1999 Ko ............................. 340/662
6,054,846 A * 4/2000 Castleman .................. 323/283
7,049,937 B1 * 5/2006 Zweig et al. ........... 340/310.11
7,113,102 B2 * 9/2006 Soemantri ................... 340/635
7,285,874 B2 * 10/2007 Menas et al. .................. 307/80
2002/0113907 A1 * 8/2002 Endo et al. .................. 348/730

FOREIGN PATENT DOCUMENTS

JP  2001-160462  6/2001

* cited by examiner

*Primary Examiner*—George A Bugg
*Assistant Examiner*—Jennifer Mehmood
(74) *Attorney, Agent, or Firm*—Gerald E. Hespos; Anthony J. Casella

(57) ABSTRACT

When a connector of a power cord is connected to an inlet of a printer, an RFID reader of the printer acquires rating information of the power cord by reading the rating information from an RFID-IC of the power cord. Then, a controller of the printer judges whether the rating of the power cord conforms to the rating of the printer based on the rating information of the power cord and rating information of the printer. If it is judged that the rating of the power cord does not conform to the rating of the printer, the controller sets the printer to a sleep mode, in which the printer is operated with a current value within the rating range of the power cord, and also causes relevant parts of the printer such as an alarm generator to issue an alert/alarm to the operator.

10 Claims, 5 Drawing Sheets

OPERATION CONTROL SYSTEM AND IMAGE FORMING APPARATUS

BACKGROUND OF THE INVENTION

1. Field of the Invention

The present invention relates to an operation control system for performing a proper control operation based on a judgment as to whether a power cord having a predetermined rating range is connected, and an image forming apparatus for use in the operation control system.

2. Description of the Related Art

Heretofore, there has been proposed a power supply control system for supplying, to an electrical apparatus, an electric power conforming to a rating. As an example of the power supply control system, Japanese Unexamined Patent Publication No. 2001-160462 proposes, for instance, an arrangement that in response to insertion of a power plug into an inlet of a power supply device, the power supply device reads out power source information from a power source information barcode attached to the power plug, and the power supply device is operative to prohibit power supply to an electrical apparatus if the power supply does not conform to the rating of an electrical apparatus.

In the above power supply control system, the electrical apparatus is usable after proper power supply from the power supply device to the electrical apparatus is secured. However, the power source information barcode is attached to an electrode of the power plug. A barcode reader provided on the power supply device reads out the power source information in contact with the barcode attached to the power plug. Accordingly, the insulating performance of the power plug is poor, which needs further improvement in securing a normal operation of the power plug. Also, the above power supply control system is designed to control power supply between the power supply device and the electrical apparatus which is operated by power supply from the power supply device, and is not designed to perform a control operation based on a judgment as to whether the rating of the electrical apparatus and the rating of a power cord to be connected to the electrical apparatus conform to each other.

SUMMARY OF THE INVENTION

In view of the above problems residing in the prior art, it is an object of the present invention to provide an arrangement that enables to judge whether an electrical apparatus, and a power cord to be connected to the electrical apparatus conform to each other in rating, and to secure proper functions of the power cord by eliminating the drawbacks due to rating incompatibility between the electrical apparatus and the power cord.

To attain the above object, an aspect of the invention is directed to an operation control system comprising: a power cord including a power cord rating information storage for storing rating information of the power cord, and an information transmitter for sending the rating information of the power cord stored in the power cord rating information storage by way of an electric wave, and an electrical apparatus including a rating information acquirer for acquiring the rating information of the power cord stored in the power cord rating information storage by the information transmitter by way of the electric wave, an electrical apparatus rating information storage for storing rating information of the electrical apparatus, a judger for judging whether a rating of the power cord conforms to a rating of the electrical apparatus based on the rating information of the power cord acquired by the rating information acquirer, and the rating information of the electrical apparatus stored in the electrical apparatus rating information storage, and a controller for setting the electrical apparatus to a sleep mode if the judger judges that the rating of the power cord does not conform to the rating of the electrical apparatus, the sleep mode being a mode in which the electrical apparatus is operated within a rating range of the power cord.

In the above arrangement, when the rating information acquirer of the electrical apparatus acquires the rating information of the power cord by the information transmitter of the power cord, the judger judges whether the rating of the power cord conforms to the rating of the electrical apparatus based on the rating information of the power cord sent by the information transmitter, and the rating information of the electrical apparatus stored in the electrical apparatus rating information storage. If the judger judges that the rating of the power cord does not conform to the rating of the electrical apparatus, the controller sets the electrical apparatus to the sleep mode where the electrical apparatus is operated at the current value within the rating range of the power cord.

With the above arrangement, if the rating of the power cord does not conform to the rating of the electrical apparatus, the electrical apparatus is set to the sleep mode where the electrical apparatus is operated at the current value within the rating range of the power cord. Accordingly, even if a power cord having a rating which does not conform to the rating of the electrical apparatus is connected to the electrical apparatus, the operation control system prevents a current exceeding the rating of the power cord from flowing in the power cord, thereby securing proper functions of the power cord.

If, on the other hand, the judger judges that the rating of the power cord conforms to the rating of the electrical apparatus, for instance, the rating of the power cord covers the rating range of the electrical apparatus, the power cord can be used for electrical apparatuses of different types, as far as the rating of the power cord covers the rating range of the electrical apparatus to be connected. This enables to solve the drawbacks due to rating incompatibility between the power cord and the electrical apparatus, while securing multi-purpose use of the power cord.

These and other objects, features and advantages of the present invention will become more apparent upon reading of the following detailed description along with the accompanying drawings.

DETAILED DESCRIPTION OF THE PREFERRED EMBODIMENTS

Figure 1:
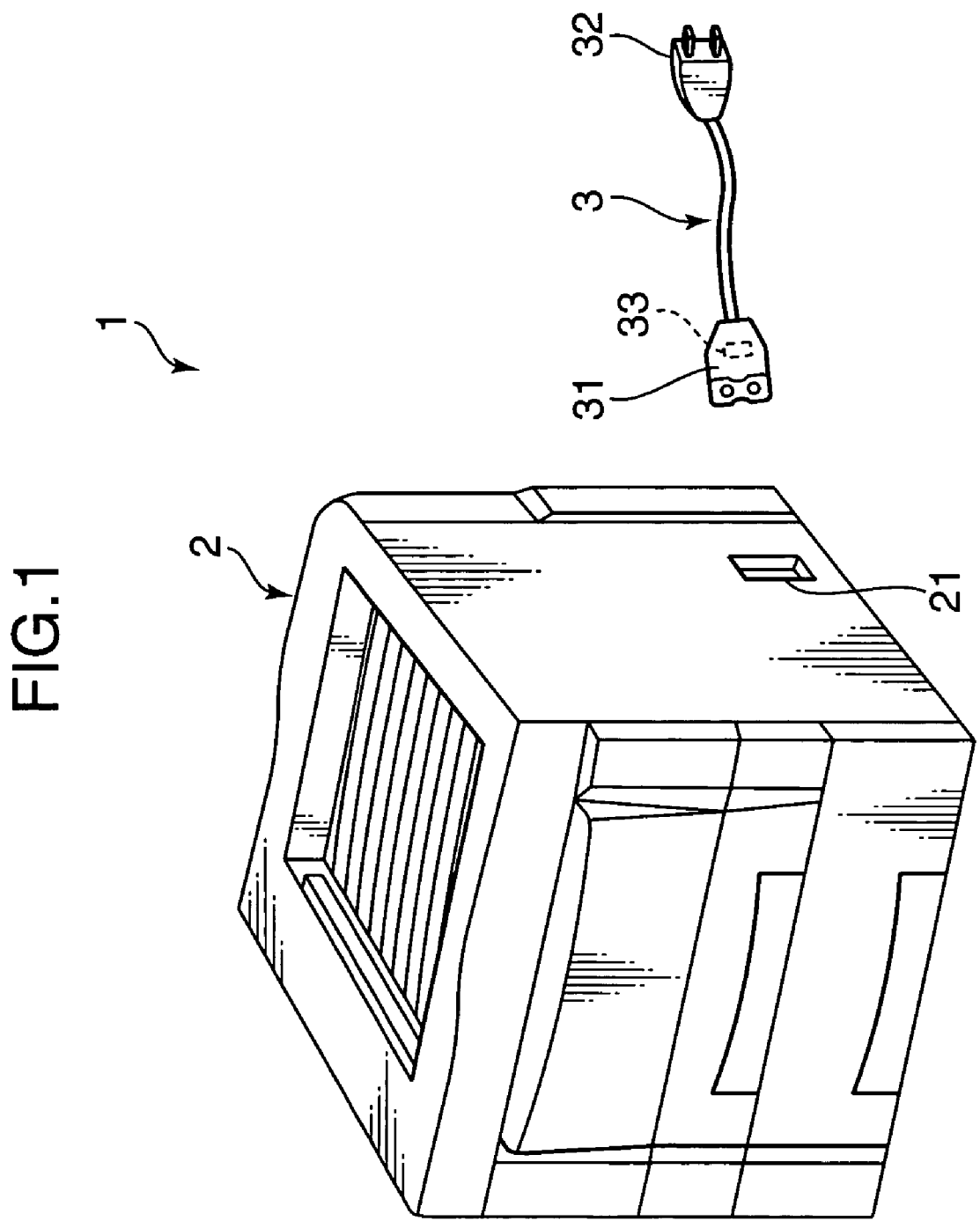
FIG. 1 is a perspective view showing an external appearance of a power cord and an image forming apparatus constituting an operation control system in accordance with an embodiment of the invention.

In the following, an image forming apparatus and an operation control system to be applied to the image forming apparatus as an embodiment of the invention are described referring to the drawings. FIG. 1 is a perspective view showing an external appearance of a power cord and the image forming apparatus constituting the operation control system as the embodiment of the invention.

The operation control system 1 includes a printer 2 as an example of the image forming apparatus, and the power cord 3 to be connected to the printer 2. The power cord 3 has a connector 31 to be connected to the printer 2, and a power plug 32 to be received in a socket outlet. The power source 3 according to the embodiment of the invention is provided with a radio frequency identification-integrated circuit (hereinafter, simply called as "RFID-IC") 33 inside the connector 31.

The printer 2 has an inlet 21 for receiving the connector 31 of the power cord 3 to secure electrical connection with the power cord 3. In the embodiment, the printer 2 is internally provided with a radio frequency identification reader (hereinafter, simply called as "RFID reader") to perform information communication with the RFID-IC 33 provided in the connector 31 of the power cord 3 when the connector 31 of the power cord 3 is mounted in the inlet 31. The RFID-IC 33 serves as a power cord rating information storage or an information transmitter. The RFID reader will be described later in detail. The printer 2 is operative to receive rating information of the power cord 3 e.g. a rated current value from the RFID-IC 33 of the power cord 3 with use of the RFID reader, and to judge whether requirements on the rated current of the power cord 3 or the like satisfy the rating requirements of the printer 2.

Figure 2:
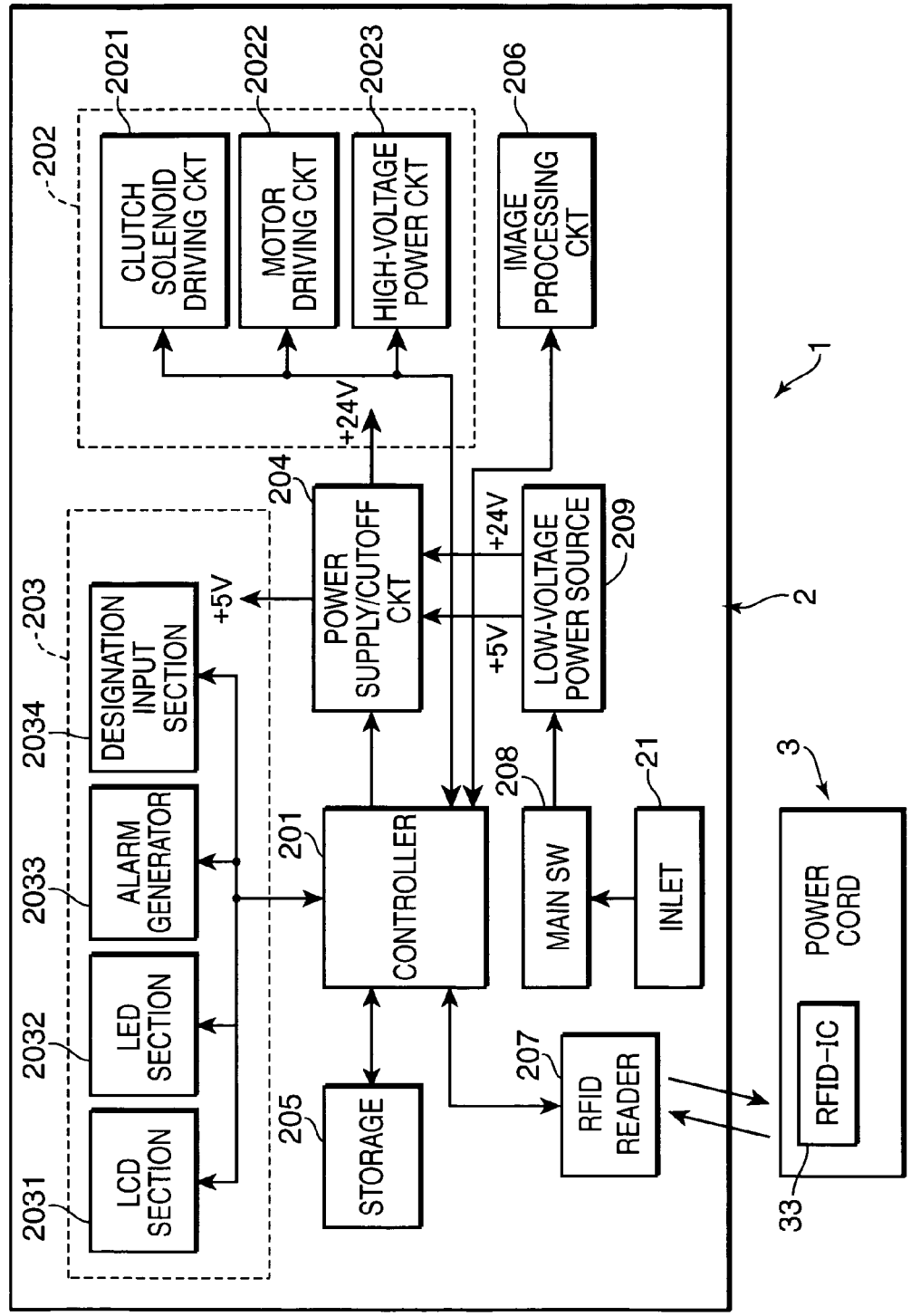
FIG. 2 is a block diagram schematically showing an electrical configuration of a printer as an example of the image forming apparatus, and the power cord constituting the operation control system.

An arrangement of the printer 2 is described. FIG. 2 is a block diagram schematically showing an electrical configuration of the printer 2 and the power cord 3 constituting the operation control system 1. The printer 2 includes: a controller 201, which serves as a controller or a judger, and is adapted to control an overall operation of the printer 2; a drive controller 202 for drivingly controlling primary mechanical components of the printer 2, such as a sheet transport mechanism and an electrophotographic image forming mechanism, for forming an image on a recording sheet; a display operation unit 203 for accepting designation on operation by an operator and for notifying the operator of various messages; and a power supply/cutoff circuit 204 for supplying power or cutting off power to the drive controller 202 and to the display operation unit 203.

The drive controller 202 has a clutch solenoid driving circuit 2021, a motor driving circuit 2022, and a high-voltage power circuit 2023 to cause the image forming mechanism to perform an image forming operation, and to cause the sheet transport mechanism to perform a recording sheet transport operation, which is conducted before and after the image forming operation. The display operation unit 203 includes a liquid crystal display (LCD) section 2031 for visually displaying various messages such as a warning to the operator, a light emitting diode (LED) section 2032 for intermittently emitting light to issue an alert to the operator, an alarm generator 2033 with a speaker or a like device for outputting an alarm to the operator, and a designation input section 2034 for accepting designation on various operations by the operator. Alternatively, the printer 2 may be provided with at least one of the LCD section 2031, the LED section 2032, and the alarm generator 2033.

Also, the printer 2 includes an electrical apparatus rating information storage 205 (hereinafter, simply called as "storage 205"), which serves as an electrical apparatus rating information storage, and is adapted to store rating information of the printer 2, an operation control program, and the like, and an image processing circuit 206 for performing image processing necessary for printing image data to be printed, which is sent from a personal computer, onto a recording sheet by the image forming mechanism.

Further, the printer 2 has the RFID reader 207 for communicating information with the RFID-IC 33 of the power cord 3 to receive the rating information of the power cord 3 e.g. an electric current value within the rating range of the power cord 3. Upon receiving the rating information of the power cord 3 from the RFID-IC 33, the RFID reader 207 sends the rating information to the controller 201. In response to receiving the rating information of the power cord 3 from the RFID reader 207, the controller 201 reads out rating information of the printer 2 stored in the storage 205, and judges whether the rating of the power cord 3 conforms to the rating of the printer 2, in other words, a current exceeding the rating of the power cord 3 will flow in the power cord 3 at the time of driving the printer 2. If the controller 201 judges that the ratings of the printer 2 and the power cord 3 do not conform to each other, the controller 201 sets the printer 2 to a sleep mode where the printer 2 is operated with a current value within the rating range of the power cord 3 e.g. 5A or less, and causes at least one of the LCD section 2031, the LED section 2032, and the alarm generator 2033 of the display operation unit 203 to issue an alert/alarm to the operator. The sleep mode is a low consumption power mode where power supply to a fixing heater or a like part, which requires a large amount of power consumption, is suspended, and the printer 2 is brought to a standby state until designation on operation is inputted by the operator.

The controller 201 controls the RFID reader 207 to output an RF signal so as to supply power to the RFID-IC 33 of the power cord 3 through electromagnetic induction. In this embodiment, information is communicated between the RFID reader 207 of the printer 2 and the RFID-IC 33 of the power cord 3 by electromagnetic induction system which is used in communication in a frequency band of 13.56 MHz or less, for instance. The RF signal to be used in the electromagnetic induction system includes command data. In response to receiving the command data, the RFID-IC 33 of the power cord 3 sends, to the RFID reader 207 of the printer 2, the rating information of the power cord 3 stored in the RFID-IC 33. Then, the controller 201 controls the RFID reader 207 to demodulate the received RF signal including the rating information sent from the RFID-IC 33, and to send the demodulated rating information to the controller 201.

When a main switch 208 of the printer 2 is turned on, a low-voltage power source 209 selectively supplies, to the power supply/cutoff circuit 204, power of 5V for driving the various devices to be controlled by the controller 201 such as the display operation unit 203, and/or power of 24V for driving the driving mechanism such as the image forming mechanism. The power supply/cutoff circuit 204 selectively supplies power of 5V and/or power of 24V to the relevant parts of the printer 2 depending on whether the printer 2 is in the sleep mode or in a normal operation mode, based on a command from the controller 201. For instance, in the case where the printer 2 is in the sleep mode, the power supply/cutoff circuit 204 supplies 5V power to the display operation unit 203 and the like, while suspending supply of 24V power to the image forming mechanism and the like. On the other hand, in the case where the printer 2 is in the normal operation mode, the power supply/cutoff circuit 204 supplies 5V power to the display operation unit 203 and the like, and also supplies 24V power to the image forming mechanism and the like. In the case where it is judged that the rating of the power cord 3 does not conform to the rating of the printer 2, the controller 201 causes the power supply/cutoff circuit 204 to supply the power for operation of the printer 2 in the sleep mode.

Figure 3:
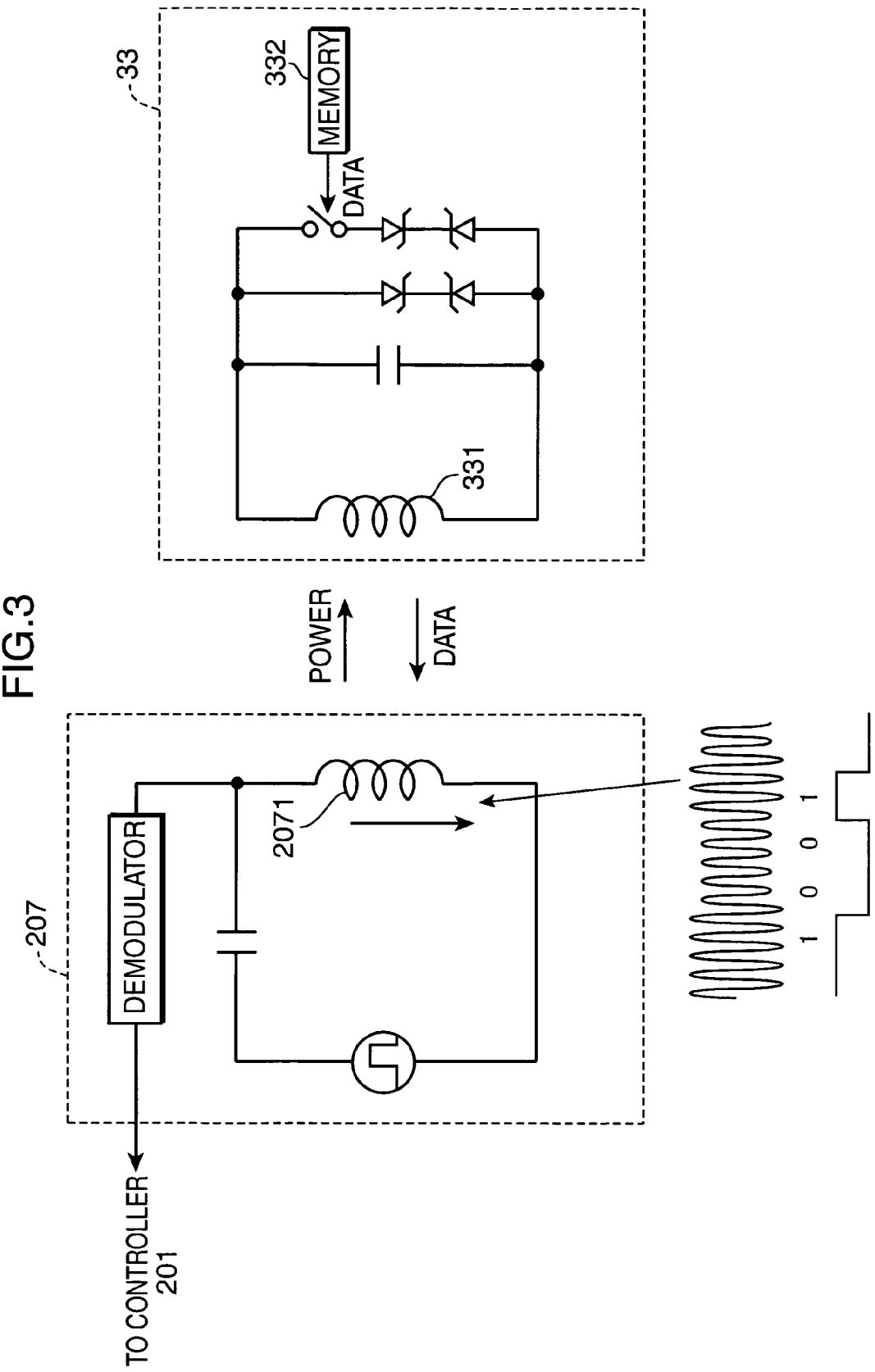
FIG. 3 is an illustration schematically showing an electrical configuration of an RFID reader of the printer, and an RFID-IC of the power cord.

FIG. 3 is an illustration schematically showing an electrical configuration of the RFID reader 207 of the printer 2, and the RFID-IC 33 of the power cord 3. FIG. 3 shows the arrangement primarily used in communication in a frequency band of 13.56 MHz or less by the aforementioned electromagnetic induction system.

Communication between the RFID reader 207 of the printer 2 and the RFID-IC 33 of the power cord 3 by the electromagnetic induction system is conducted by utilizing power obtained by allowing an electromagnetic wave generated at one of the coils of the RFID reader 207 and the RFID-IC 33 to be received by the other one of the coils, and by converting the received electromagnetic wave into an electromagnetic energy. In the arrangement shown in FIG. 3, the RFID reader 207 of the printer 2 constantly outputs an electromagnetic wave during communication with the RFID-IC 33 of the power cord 3. On the other hand, the RFID-IC 33 of the power cord 3 receives power energy of the electromagnetic wave from the RFID reader 207. The power energy is used as power for an RFID IC chip of the RFID-IC 33 of the power cord 3.

Specifically, the RFID reader 207 sends the RF signal i.e. the electromagnetic wave, which is a combination of power energy and data, from an antenna coil 2071 provided in the RFID reader 207 to the RFID-IC 33 of the power cord 3. The RFID-IC 33 of the power cord 3 receives the RF signal by way of a coil 331, which serves as the information transmitter, converts the received RF signal into power for operating the RFID-IC chip, and at the same time extracts the data included in the RF signal. Rating information of the power cord 3 is stored in a memory 332 of the power cord 3. The memory 332 serves as the power cord rating information storage. The rating information of the power cord 3 is read out from the memory 332 in accordance with the contents of the command data included in the extracted data in the RF signal. When the RFID-IC 33 sends the data read out from the memory 332 such as the rating information of the power cord 3 to the RFID reader 207 of the printer 2, the data is sent to the RFID reader 207 by way of the coil 331 in the same carrier frequency of the RF signal, which has been transmitted from the RFID reader 207. The RF signal differs depending on specifications of IC chips.

Figure 4:
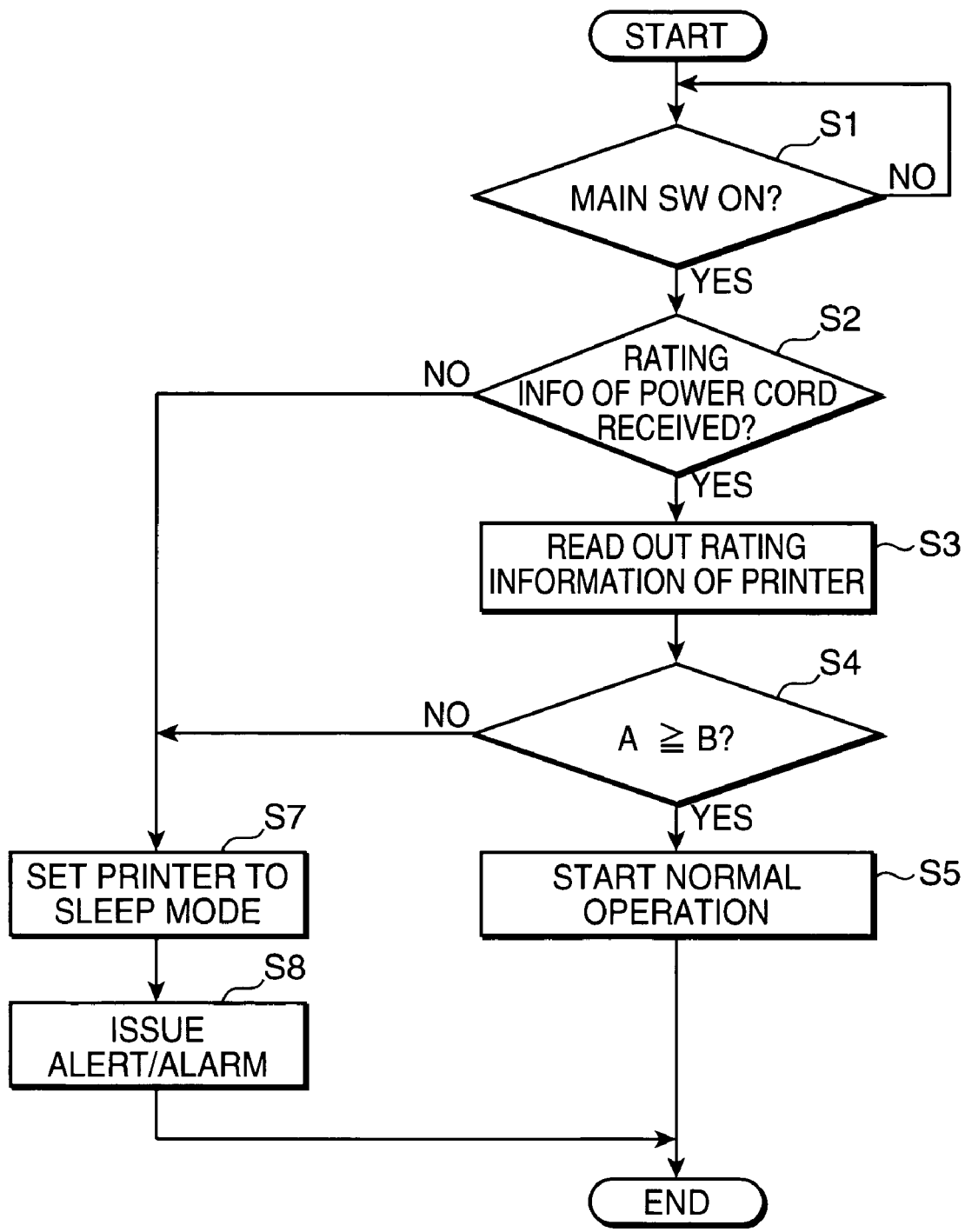
FIG. 4 is a flowchart showing a control operation of the printer in conformity to a rating of the power cord in the operation control system.

FIG. 4 is a flowchart showing a control operation of the printer 2 in accordance with the rating of the power cord 3 in the operation control system 1. When the main switch 208 of the printer 2 is turned on (YES in Step S1), the controller 201 judges whether the RFID reader 207 has received rating information of the power cord 3 from the RFID-IC 33 (Step S2). If it is judged that the rating information of the power cord 3 is not sent from the RFID-IC 33 (NO in Step S2), the controller 201 sets the printer 2 to the sleep mode by controlling the power supply/cutoff circuit 204 to supply power of 5V to the display operation unit 203 and the like, while suspending supply of power of 24V to the image forming mechanism and the like, which requires a relatively large power (Step S7). Also, the controller 201 causes at least one of the LCD section 2031, the LED section 2032, and the alarm generator 2033 of the display operation unit 203 to issue an alert/alarm to the operator (Step S8). For instance, causing the LCD section 2031 to display a warning message enables to notify the operator of the message that the power cord 3 having a rating which does not conform to the rating of the printer 2 has been connected, and to prompt the operator to replace the power cord 3 with a power cord having a rating in conformity to the rating of the printer 2.

If, on the other hand, it is judged that the rating information of the power cord 3 has been sent from the RFID-IC 33 (YES in Step S2), the controller 201 reads out the rating information of the printer 2 from the storage 205 (Step S3), and judges whether the rating of the power cord 3 covers the rating range of the printer 2, in other words, if a rated current value A representing the rating information of the power cord 3 is equal to or larger than a rated current value B representing the rating information of the printer 2 (Step S4).

If the rated current value A of the power cord 3 is smaller than the rated current value B of the printer 2, namely, A<B (NO in Step S4), the controller 201 sets the printer 2 to the sleep mode as in the case of the negative result in Step S2 (Step S7), and controls the display operation unit 203 to issue an alert/alarm to the operator (Step S8).

If, on the other hand, the rated current value A of the power cord 3 is equal to or larger than the rated current value B of the printer 2, namely, A≧B (YES in Step S4), the controller 201 controls the power supply/cutoff circuit 204 to supply power of 5V to the display operation unit 203 and the like, and also supply power of 24V to the image forming mechanism and the like, and sets the printer 2 to the normal operation mode by executing an initialization routine such as a self-test operation, i.e., by allowing the printer 2 to escape from the low power consumption state (Step S5).

In this way, controlling the printer 2 to perform the aforementioned control operation depending on the rating of the power cord 3 enables to prevent a current exceeding the rating of the power cord 3 from flowing into the power cord 3 even if the power cord 3 whose rating does not conform to the rating of the printer 2 is connected to the printer 2. This secures proper functions of the power cord 3. Also, this arrangement enables to prompt the operator to connect a power cord having a rating in conformity to the rating of the printer 2.

Figure 5A:
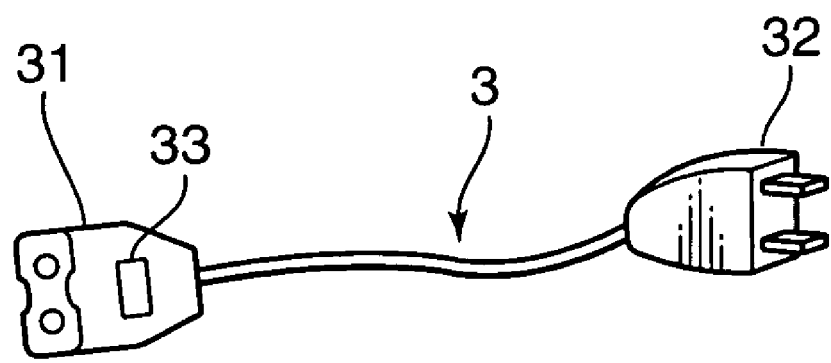
FIGS. 5A and 5B are illustrations showing modifications of the power cord.
Figure 5B:
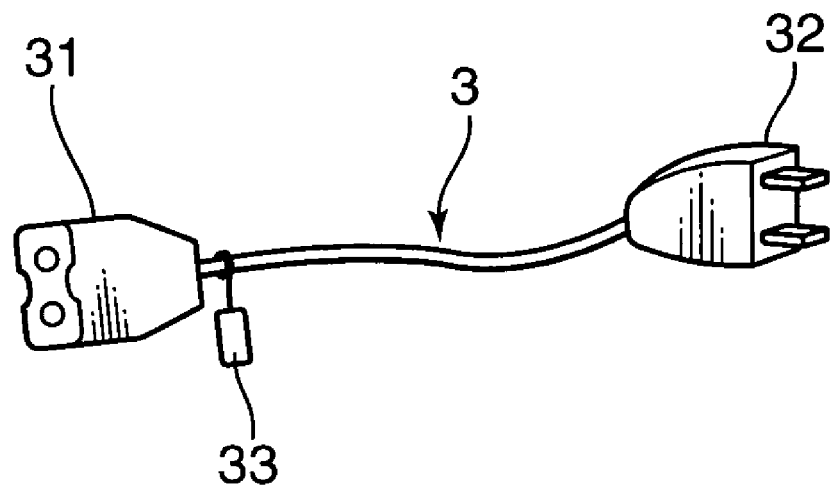

As shown in FIG. 1, in the embodiment, the RFID-IC 33 is provided in the power cord 3. Alternatively, as shown in FIG. 5A, for instance, the RFID-IC 33 may be attached to an outer surface of the connector 31. Further alternatively, as shown in FIG. 5B, for instance, the RFID-IC 33 may be hung from a well-known power cord in the form of a tag. In both of the altered arrangements, the power cord 3 adapted to the operation control system 1 of the invention can be produced by merely providing the power cord 3 with the RFID-IC 33, without modifying the arrangement of the well-known power cord.

In the embodiment, the printer 2, as an example of the electrical apparatus of the invention, has been described. The electrical apparatus of the invention is not limited to an image forming apparatus such as the printer 2, but may be an electrical apparatus which is made operable by being connected to the power cord.

In the embodiment, an example of the rating information is a rated current value. Alternatively, the rating information may include a rated voltage value, a length of the power cord or a power cable, and a shape or a type of the power plug.

In the embodiment, the arrangement and processing of the operation control system 1 have been described referring to FIGS. 1 through 5B, which is merely an example of the embodiment. The arrangement and processing of the inventive operation control system are not limited to the foregoing.

To summarize the invention, an operation control system comprises: a power cord including a power cord rating information storage for storing rating information of the power cord, and an information transmitter for sending the rating information of the power cord stored in the power cord rating information storage by way of an electric wave, and an electrical apparatus including a rating information acquirer for acquiring the rating information of the power cord stored in the power cord rating information storage by the information transmitter by way of the electric wave, an electrical apparatus rating information storage for storing rating information of the electrical apparatus, a judger for judging whether a rating of the power cord conforms to a rating of the electrical apparatus based on the rating information of the power cord acquired by the rating information acquirer, and the rating information of the electrical apparatus stored in the electrical apparatus rating information storage, and a controller for setting the electrical apparatus to a sleep mode if the judger judges that the rating of the power cord does not conform to the rating of the electrical apparatus, the sleep mode being a mode in which the electrical apparatus is operated within a rating range of the power cord.

With the above arrangement, if the rating of the power cord does not conform to the rating of the electrical apparatus, the electrical apparatus is set to the sleep mode where the electrical apparatus is operated at the current value within the rating range of the power cord. Accordingly, even if a power cord having a rating which does not conform to the rating of the electrical apparatus is connected to the electrical apparatus, the operation control system prevents a current exceeding the rating of the power cord from flowing in the power cord, thereby securing proper functions of the power cord.

If, on the other hand, the judger judges that the rating of the power cord conforms to the rating of the electrical apparatus, for instance, the rating of the power cord covers the rating range of the electrical apparatus, the power cord can be used for electrical apparatuses of different types, as far as the rating of the power cord covers the rating range of the electrical apparatus to be connected. This enables to solve the drawbacks due to rating incompatibility between the power cord and the electrical apparatus, while securing multi-purpose use of the power cord.

Preferably, the electrical apparatus may further include an alert device for issuing an alert to an operator, and the controller may set the electrical apparatus to the sleep mode, and controls the alert device to issue the alert to the operator if the judger judges that the rating of the power cord does not conform to the rating of the electrical apparatus.

With this arrangement, if the rating of the power cord and the rating of the electrical apparatus do not conform to each other, the electrical apparatus is set to the sleep mode where the electrical apparatus is operated at the current value within the rating range of the power cord, and the alert device issues the alert to the operator. Accordingly, even if the power cord having a rating which does not conform to the rating of the electrical apparatus is connected to the electrical apparatus, this arrangement prevents a current exceeding the rating range of the power cord from flowing in the power cord, thereby securing proper functions of the power cord. Also, this arrangement enables to prompt the operator to connect a power cord having a rating in conformity to the rating of the electrical apparatus.

Preferably, the information transmitter of the power cord may be communicable with the rating information acquirer of the electrical apparatus only in a condition that the power cord is connected to the electrical apparatus.

With this arrangement, the power cord is communicable with the electrical apparatus only in the condition that the power cord is connected to the electrical apparatus. If the power cord is provided away from the electrical apparatus, information is not communicated between the power cord and the electrical apparatus, which enables to eliminate waste of power consumption. Since the power cord is communicable with the electrical apparatus only in the condition that the power cord is provided sufficiently close to the electrical apparatus, unduly interference of the communication by connection of an electrical apparatus other than the electrical apparatus of the invention with the power cord of the invention, or by connection of a power cord other than the power cord of the invention with the electrical apparatus of the invention can be prevented.

Another aspect of the invention is directed to an image forming apparatus for judging whether a rating of a power cord to be connected to the image forming apparatus lies within a predetermined range. The image forming apparatus comprises: a rating information acquirer for acquiring rating information of the power cord by an information transmitter provided in the power cord, the information transmitter sending the rating information of the power cord by way of an electric wave; an apparatus rating information storage for storing rating information of the image forming apparatus; an alert device for issuing an alert to an operator; a judger for judging whether a rating of the power cord conforms to a rating of the image forming apparatus based on the rating information of the power cord acquired by the rating information acquirer, and the rating information of the image forming apparatus stored in the apparatus rating information storage; and a controller for setting the image forming apparatus to a sleep mode, and controlling the alert device to issue the alert to the operator if the judger judges that the rating of the power cord does not conform to the rating of the image forming apparatus, the sleep mode being a mode in which the image forming apparatus is operated within the rating range of the power cord.

With the above arrangement, if the rating of the power cord does not conform to the rating of the image forming apparatus, the image forming apparatus is set to the sleep mode where the image forming apparatus is operated at the current value within the rating range of the power cord, and the alert device issues the alert. Accordingly, even if a power cord having a rating which does not conform to the rating of the image forming apparatus is connected to the image forming apparatus, this arrangement prevents a current exceeding the rating of the power cord from flowing in the power cord, thereby securing proper functions of the power cord. Also, this arrangement enables to prompt the operator to connect a power cord having a rating in conformity to the rating of the image forming apparatus.

This application is based on Japanese Patent Application No. 2005-67977 filed on Mar. 10, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An operation control system comprising:
   a power cord including
      a power cord rating information storage for storing rating information of the power cord, and an information transmitter for sending the rating information of the power cord stored in the power cord rating information storage by way of an electric wave, and an electrical apparatus including a rating information acquirer for acquiring the rating information of the power cord stored in the power cord rating information storage from the information transmitter by way of the electric wave, an electrical apparatus rating information storage for storing rating information of the electrical apparatus, a judger for judging whether a rating of the power cord conforms to a rating of the electrical apparatus based on the rating information of the power cord acquired by the rating information acquirer, and the rating information of the electrical apparatus stored in the electrical apparatus rating information storage, and a controller for setting the electrical apparatus to a sleep mode if the judger judges that the rating of the power cord does not conform to the rating of the electrical apparatus, wherein in the sleep mode, the controller causes a mechanism in the electrical apparatus to selectively permit operation of parts of the electrical apparatus so that the electrical apparatus operates at a current value within a rating range of the power cord while preventing operation of parts of the electrical apparatus that have a current value that is not within the rating range of the power cord.

2. The operation control system according to claim 1, wherein the electrical apparatus further includes an alert device for issuing an alert to an operator, and the controller sets the electrical apparatus to the sleep mode, and controls the alert device to issue the alert to the operator if the judger judges that the rating of the power cord does not conform to the rating of the electrical apparatus.

3. The operation control system according to claim 1, wherein the information transmitter of the power cord is communicable with the rating information acquirer of the electrical apparatus only in a condition that the power cord is connected to the electrical apparatus.

4. The operation control system according to claim 2, wherein the information transmitter of the power cord is communicable with the rating information acquirer of the electrical apparatus only in a condition that the power cord is connected to the electrical apparatus.

5. An image forming apparatus for judging whether a rating of a power cord to be connected to the image forming apparatus lies within a predetermined range, the image forming apparatus comprising:

a rating information acquirer for acquiring rating information of the power cord by an information transmitter provided in the power cord, the information transmitter sending the rating information of the power cord by way of an electric wave;

an apparatus rating information storage for storing rating information of the image forming apparatus;

an alert device for issuing an alert to an operator;

a judger for judging whether a rating of the power cord conforms to a rating of the image forming apparatus based on the rating information of the power cord acquired by the rating information acquirer, and the rating information of the image forming apparatus stored in the apparatus rating information storage; and a controller for setting the image forming apparatus to a sleep mode, and controlling the alert device to issue the alert to the operator if the judger judges that the rating of the power cord does not conform to the rating of the image forming apparatus, wherein in the sleep mode the controller causes a mechanism in the image forming apparatus to selectively permit operation of parts of the image forming apparatus so that the image forming apparatus operates at a current value within the rating range of the power cord while preventing operation of parts of the image forming apparatus that have a current value that is not within the rating range of the power cord.

6. The image forming apparatus according to claim 5, wherein the controller causes the mechanism in the image forming apparatus to selectively supply or suspend power to parts of the image forming apparatus so that the image forming apparatus operates at a current value within the rating range of the power cord while preventing operation of parts of the image forming apparatus that have a current value that is not within the rating range of the power cord.

7. An operation control system comprising:

a power cord including a rating information device coupled to the power cord for transmitting rating information of the power cord by way of an electromagnetic wave, and an electrical apparatus including a rating information acquirer for acquiring the rating information of the power cord by way of the electromagnetic wave, an electrical apparatus rating information storage for storing rating information of the electrical apparatus, a judger for judging whether a rating of the power cord conforms to a rating of the electrical apparatus based on the rating information of the power cord acquired by the rating information acquirer, and the rating information of the electrical apparatus stored in the electrical apparatus rating information storage, and a controller for setting the electrical apparatus to a sleep mode if the judger judges that the rating of the power cord does not conform to the rating of the electrical apparatus, the sleep mode being a mode in which the electrical apparatus is operated within a rating range of the power cord.

8. The operation control system according to claim 7, wherein the rating information device further comprises:

a power cord rating information storage for storing the rating information of the power cord, and an information transmitter for sending the rating information of the power cord stored in the power cord rating information storage by way of the electromagnetic wave.

9. The operation control system according to claim 7, wherein the rating information device is a radio frequency identification integrated circuit.

10. The operation control system of claim 1, wherein the information transmitter is an electromagnetic wave transmitter.

* * * * *